US012772201B2

(12) United States Patent
Ashraf et al.

(10) Patent No.: US 12,772,201 B2
(45) Date of Patent: Oct. 20, 2026

(54) MODEL MONITORING FOR POSITIONING

(71) Applicant: Nokia Technologies Oy, Espoo (FI)

(72) Inventors: Muhammad Ikram Ashraf, Espoo (FI); Ganesh Venkatraman, Oulu (FI); Afef Feki, Sceaux (FR); Jerediah Fevold, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 256 days.

(21) Appl. No.: 18/792,760

(22) Filed: Aug. 2, 2024

(65) Prior Publication Data

US 2025/0056477 A1 Feb. 13, 2025

Related U.S. Application Data

(60) Provisional application No. 63/517,962, filed on Aug. 7, 2023.

(51) Int. Cl.

| | |
|---|---|
| ***H04W 4/00*** | (2018.01) |
| ***H04B 17/318*** | (2015.01) |
| ***H04W 24/08*** | (2009.01) |
| ***H04W 64/00*** | (2009.01) |

(52) U.S. Cl.

CPC .......... *H04W 64/00* (2013.01); *H04B 17/328* (2023.05); *H04W 24/08* (2013.01)

(58) Field of Classification Search

None

See application file for complete search history.

(56) References Cited

U.S. PATENT DOCUMENTS

| | | | | |
|---|---|---|---|---|
| 2024/0073855 | A1* | 2/2024 | Zorgui | G01S 5/0236 |
| 2025/0379702 | A1* | 12/2025 | Huang | H04L 5/0048 |

FOREIGN PATENT DOCUMENTS

| | | | | |
|---|---|---|---|---|
| WO | WO-2022250805 A1 * | 12/2022 | | H04L 5/005 |
| WO | WO-2024027939 A1 * | 2/2024 | | G06N 3/08 |
| WO | WO-2024253735 A1 * | 12/2024 | | H04B 7/18513 |

* cited by examiner

*Primary Examiner* — Zewdu A Beyen

(74) *Attorney, Agent, or Firm* — Barta Jones, PLLC

(57) ABSTRACT

Example embodiments of the present disclosure relate to methods, devices, apparatuses and computer readable storage medium for a model monitoring for positioning, especially for assisted Artificial Intelligence/Machine Learning (AI/ML) positioning without measured ground truth (GT). The method comprises: determining, based on three or more transmission reception points, TRPs, at least one reference location associated with a positioning performance monitoring of a second apparatus; generating assistance data for monitoring a positioning performance at the second apparatus at least comprising at least one of: respective positioning measurement data of at least one positioning measurement type in the at least one reference location; respective monitoring metric associated with the at least one positioning measurement type in the at least one reference location; or the at least one reference location; and transmitting the assistance data to a second apparatus.

20 Claims, 5 Drawing Sheets

MODEL MONITORING FOR POSITIONING

FIELDS

Various example embodiments of the present disclosure generally relate to the field of telecommunication and in particular, to methods, devices, apparatuses and computer readable storage medium for a model monitoring for positioning, especially for assisted Artificial Intelligence/Machine Learning (AI/ML) positioning without measured ground truth (GT).

BACKGROUND

Location-awareness enables various location-based services in different applications and thus is a fundamental aspect of wireless communication networks. The integration and utilization of location information in day-to-day applications are growing significantly as the technology evolves.

Now the positioning technology may depend on AI algorithms, which is intrinsically superior in terms of accuracy and efficiency for a positioning inference. In this aspect, a model monitoring for the positioning performance is important for guaranteeing the positioning accuracy.

SUMMARY

In a first aspect of the present disclosure, there is provided a first apparatus. The first apparatus comprises at least one processor; and at least one memory storing instructions that, when executed by the at least one processor, cause the first apparatus at least to: determine, based on three or more transmission reception points (TRPs) at least one reference location associated with a positioning performance monitoring of a second apparatus; generate assistance data for monitoring a positioning performance at the second apparatus comprising at least one of: respective positioning measurement data of at least one positioning measurement type in the at least one reference location; respective monitoring metric associated with the at least one positioning measurement type in the at least one reference location; or the at least one reference location; and transmit the assistance data to a second apparatus.

In a second aspect of the present disclosure, there is provided a second apparatus. The second apparatus comprises at least one processor; and at least one memory storing instructions that, when executed by the at least one processor, cause the second apparatus at least to: receive, from a first apparatus, assistance data for monitoring a positioning performance at the second apparatus comprising at least one of: respective positioning measurement data of at least one positioning measurement type in at least one reference location associated with a positioning performance monitoring of the second apparatus; respective monitoring metric associated with the at least one positioning measurement type in the at least one reference location; or the at least one reference location; and perform the monitoring for the positioning performance based on the assistance data.

In a third aspect of the present disclosure, there is provided a method. The method comprises: determining, based on three or more transmission reception points, TRPs, at least one reference location associated with a positioning performance monitoring of a second apparatus; generating assistance data for monitoring a positioning performance at the second apparatus at least comprising at least one of: respective positioning measurement data of at least one positioning measurement type in the at least one reference location; respective monitoring metric associated with the at least one positioning measurement type in the at least one reference location; or the at least one reference location; and transmitting the assistance data to a second apparatus.

In a fourth aspect of the present disclosure, there is provided a method. The method comprises: receiving, from a first apparatus, assistance data for monitoring a positioning performance at the second apparatus comprising at least one of: respective positioning measurement data of at least one positioning measurement type in at least one reference location associated with a positioning performance monitoring of the second apparatus; respective monitoring metric associated with the at least one positioning measurement type in the at least one reference location; or the at least one reference location; and performing the monitoring for the positioning performance based on the assistance data.

In a fifth aspect of the present disclosure, there is provided a first apparatus. The first apparatus comprises means for determining, based on three or more transmission reception points, TRPs, at least one reference location associated with a positioning performance monitoring of a second apparatus; means for generating assistance data for monitoring a positioning performance at the second apparatus at least comprising at least one of: respective positioning measurement data of at least one positioning measurement type in the at least one reference location; respective monitoring metric associated with the at least one positioning measurement type in the at least one reference location; or the at least one reference location; and means for transmitting the assistance data to a second apparatus.

In a sixth aspect of the present disclosure, there is provided a second apparatus. The second apparatus comprises means for receiving, from a first apparatus, assistance data for monitoring a positioning performance at the second apparatus comprising at least one of: respective positioning measurement data of at least one positioning measurement type in at least one reference location associated with a positioning performance monitoring of the second apparatus; respective monitoring metric associated with the at least one positioning measurement type in the at least one reference location; or the at least one reference location; and means for performing the monitoring for the positioning performance based on the assistance data.

In a seventh aspect of the present disclosure, there is provided a computer readable medium. The computer readable medium comprises instructions stored thereon for causing an apparatus to perform at least the method according to the third aspect.

In an eighth aspect of the present disclosure, there is provided a computer readable medium. The computer readable medium comprises instructions stored thereon for causing an apparatus to perform at least the method according to the fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
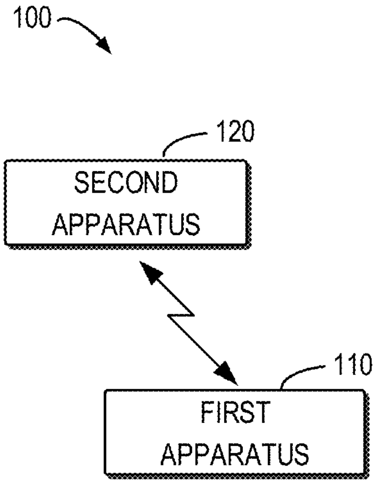
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second," . . . , etc. in front of noun(s) and the like may be used herein to describe various elements, these elements should not be limited by these terms. These terms are only used to distinguish one element from another and they do not limit the order of the noun(s). For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G), the sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (cNodeB or eNB), an NR NB (also referred to as a gNB), a Remote Radio Unit (RRU), a radio head (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term “terminal device” refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms “terminal device”, “communication device”, “terminal”, “user equipment” and “UE” may be used interchangeably.

As used herein, the term “resource,” “transmission resource,” “resource block,” “physical resource block” (PRB), “uplink resource,” or “downlink resource” may refer to any resource for performing a communication, for example, a communication between a terminal device and a network device, such as a resource in time domain, a resource in frequency domain, a resource in space domain, a resource in code domain, or any other combination of the time, frequency, space and/or code domain resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

FIG. 1 illustrates an example communication environment 100 in which example embodiments of the present disclosure can be implemented. In the communication environment 100, there are a plurality of communication devices, for example, a first apparatus 110 and a second apparatus 120. The second apparatus 120 can communicate with the first apparatus 110.

In some scenarios, the first apparatus 110 may be a server or a node or a network device that provides positioning related services. For example, the first apparatus 110 may be a Location Management Function (LMF) node. The second apparatus 120 may be a terminal device, for example, a UE. In some embodiments, the first apparatus 110 may be a core network device, and the second apparatus 120 may be a terminal device.

In the following, for the purpose of illustration, some example embodiments are described with the first apparatus 110 operating as a LMF node and the second apparatus 120 operating as terminal device. However, it is to be understood that the above examples are just discussed for purpose of illustrations rather than limitations.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

As described above, the positioning technology may depend on AI algorithms such as an AI/ML positioning model. The corresponding terminologies are listed as below:

TABLE 1

| Terminology | Description |
|---|---|
| Data collection | A process of collecting data by the network nodes, management entity, or UE for the purpose of AI/ML model training, data analytics and inference |
| AI/ML Model | A data driven algorithm that applies AI/ML techniques to generate a set of outputs based on a set of inputs. |
| AI/ML model training | A process to train an AI/ML Model [by learning the input/output relationship] in a data driven manner and obtain the trained AI/ML Model for inference |
| AI/ML model Inference | A process of using a trained AI/ML model to produce a set of outputs based on a set of inputs |

TABLE 1-continued

| Terminology | Description |
|---|---|
| AI/ML model validation | A subprocess of training, to evaluate the quality of an AI/ML model using a dataset different from one used for model training, that helps selecting model parameters that generalize beyond the dataset used for model training. |
| AI/ML model testing | A subprocess of training, to evaluate the performance of a final AI/ML model using a dataset different from one used for model training and validation. Differently from AI/ML model validation, testing does not assume subsequent tuning of the model. |
| UE-side (AI/ML) model | An AI/ML Model whose inference is performed entirely at the UE |
| Network-side (AI/ML) model | An AI/ML Model whose inference is performed entirely at the network |
| One-sided (AI/ML) model | A UE-side (AI/ML) model or a Network-side (AI/ML) model |
| Model monitoring | A procedure that monitors the inference performance of the AI/ML model |
| Supervised learning | A process of training a model from input and its corresponding labels. |
| Model activation | enable an AI/ML model for a specific function |
| Model deactivation | disable an AI/ML model for a specific function |
| Model switching | Deactivating a currently active AI/ML model and activating a different AI/ML model for a specific function |

An ongoing study item in Rel-18 investigate aims to explore the benefits of augmenting the air-interface with AI/ML. One of the highlighted use cases is positioning accuracy enhancements considering AI/ML methodology. For instance, AI/ML based methodology could be used to drive line of sight (LOS)/non-line of sight (NLOS) classifications in order to achieve higher positioning accuracy. The scope of the study item is not limited to only the LOS/NLOS classification for positioning accuracy and can include any validation of ML model for any positioning measurements. Furthermore, the study item may assess potential specification impact to support AI-ML with different level of collaborations between UE and network. Initial sets of use cases and potential standard impacts are as follow:

TABLE 2

| |
|---|
| Use cases to focus on: |
| Initial set of use cases includes: |
| CSI feedback enhancement, e.g., overhead reduction, improved accuracy, prediction [RAN1] |
| Beam management, e.g., beam prediction in time, and/or spatial domain for overhead and latency reduction, beam selection accuracy improvement [RAN1] |
| Positioning accuracy enhancements for different scenarios including, e.g., those with heavy NLOS conditions [RAN1] |
| Finalize representative sub use cases for each use case for characterization and baseline performance evaluations by RAN#98 |
| The AI/ML approaches for the selected sub use cases need to be diverse enough to support various requirements on the gNB-UE collaboration levels |
| AI/ML model, terminology and description to identify common and specific characteristics for framework investigations: |
| Characterize the defining stages of AI/ML related algorithms and associated complexity: |
| Model generation, e.g., model training (including input/output, pre-/post-process, online/offline as applicable), model validation, model testing, as applicable |
| Inference operation, e.g., input/output, pre-/post-process, as applicable |
| Identify various levels of collaboration between UE and gNB pertinent to the selected use cases, e.g., |
| No collaboration: implementation-based only AI/ML algorithms without information exchange [for comparison purposes] |
| Various levels of UE/gNB collaboration targeting at separate or joint ML operation. |
| Characterize lifecycle management of AI/ML model: e.g., model training, model deployment, model inference, model monitoring, model updating |
| Dataset(s) for training, validation, testing, and inference |
| Identify common notation and terminology for AI/ML related functions, procedures and interfaces |

Note:
Consider the work done for FS_NR_ENDC_data_collect when appropriate

A pre-requirement in AI/ML supervised learning is that testing and validation data need to be labelled beforehand, which sounds obvious. Data labelling is not for free, as it typically requires external devices to support an in-field measurement. The positioning reference unit (PRU) may be intrinsically suitable to accommodate real-world measurement and labelling for AIML based learning.

There are 5 use-cases under discussion as part of the study item on AIML for air interface, namely:

Case 1: UE-based positioning with UE-side model, direct AI/ML or AI/ML assisted positioning;

Case 2a: UE-assisted/LMF-based positioning with UE-side model, AI/ML assisted positioning;

Case 2b: UE-assisted/LMF-based positioning with LMF-side model, direct AI/ML positioning;

Case 3a: NG-RAN node assisted positioning with gNB-side model, AI/ML assisted positioning;

Case 3b: NG-RAN node assisted positioning with LMF-side model, direct AI/ML positioning.

Furthermore, according to some agreement on model monitoring, regarding AI/ML model monitoring for AI/ML based positioning, it has been agreed to study and provide inputs on benefit(s), feasibility, necessity and potential specification impact for the following aspects:

Entity to derive monitoring metric.

UE at least for Case 1 and 2a (with UE-side model)

FFS PRU for Case 1 and 2a gNB at least for Case 3a (with gNB-side model)

FFS gNB for Case 3b (with LMF-side model)

LMF at least for Case 2b and 3*b* (with LMF-side model)

If model monitoring does not require ground truth label (or its approximation).

Monitoring metric, e.g., statistics of measurement, relative displacement, inference output inconsistency, etc.

Assistance signaling and procedure, e.g., RS configuration(s) for measurement, measurement statistics as compared to the model input statistics of the training data, etc.

report of the calculated metric and/or model monitoring decision

If model monitoring requires and is provided ground truth label (or its approximation)

Monitoring metric, e.g., statistics of the difference between model output and ground truth label, etc.

Assistance signaling and procedure, e.g., from LMF to UE/gNB indicating ground truth label and/or measurement, etc.

report of the calculated metric and/or model monitoring decision

Regarding ground truth label generation for AI/ML based positioning, the following options of entity to generate ground truth label are identified when beneficial and necessary (e.g., limited PRU availability):

UE with estimated/known location generates ground truth label and corresponding label quality indicator based on non-NR and/or NR RAT-dependent and/or NR RAT-independent positioning methods.

At least for UE-based positioning with UE-side model (Case 1) and UE-assisted positioning with UE-side model (Case 2a)

Network entity generates ground truth label and corresponding label quality indicator based on non-NR and/or NR RAT-dependent and/or NR RAT-independent positioning methods At least for UE-assisted/LMF-based positioning with LMF-side model (Case 2b), NG-RAN node assisted positioning with gNB-side model (Case 3a) and NG-RAN node assisted positioning with LMF-side model (Case 3b)

Regarding monitoring for AI/ML based positioning, at least the following monitoring methods with potential specification impact are identified:

Model monitoring based on provided ground truth label (or its approximation)

Monitoring metric: statistics of the difference between model output and provided ground truth label FFS details of statistics For monitoring UE-side and gNB-side model signaling from monitoring entity to request ground truth label (if needed)

signaling from monitoring entity to request model output (if needed)

signaling for potential request/report of monitoring metric (if needed)

Note: there may not be any specification impact

For monitoring LMF-side model signaling from LMF to request measurement(s) (if needed)

FFS applicability to each case (Case 1 to 3b)

Model monitoring without ground truth label

Monitoring metric:

FFS: statistics of measurement(s) compared to the statistics associated with the training data, statistics associated with the model output FFS details of statistics FFS details of what type of measurement(s)

For monitoring UE-side and gNB-side model signaling from LMF to facilitate the monitoring entity to derive the monitoring metric (if needed)

signaling from monitoring entity to request measurement(s) (if needed)

signaling for potential request/report of monitoring metric (if needed)

For monitoring LMF-side model signaling from LMF to request measurement(s) (if needed).

FFS applicability to each case (Case 1 to 3b)

The model monitoring may be considered as part of life cycle management (LCM). In a process of testing and validation of ML models, the training dataset is split into non-overlapping training, i.e., test datasets and validation datasets. As the name implies, training dataset is used for training of the ML model. The test dataset is used to evaluate the accuracy of the ML model training, while validation dataset is used to obtain the accuracy of the model after training. The ML model may be described as a function with parameters w, input X, and output $\hat{Y}$ i.e., $f(X|w)=\hat{Y}$.

An example of validation would be taking the validation data-set, i.e., $(X^{validation}, Y^{validation})$, and comparing the neural network output with the validation labels i.e., $L=(f(X^{validation}|w)-Y^{validation})^2$.

In ML based positioning, supervised learning-based approach is used in order to estimate either the UE position (referred to as direct AI/ML in Case 1, Case 2b, Case 3b) or intermediate features (such as LoS/NLOS flag, ToA, AoD, RSRP, RSRPP etc. for Case 1, Case 2a, Case 3a). The training of the supervised model requires labelled datasets corresponding to ML inputs (e.g., radio measurements) and the corresponding ML output (UE position or Intermediate feature).

Specifically, for assisted AIML model for positioning (e.g., LOS/NLOS classification, Time of Arrival (ToA), positioning measurements) needs to be validated against the labelled data in order to increase the confidence in the model output. The "labels" are de facto trusted and thus are considered to be the ground truth. The collection of ground truth (labelled data) can be realized through PRU or UEs for which high accuracy positioning methods can be applied. These gathered ground truth samples are thereafter intended to be used for model training as well as model monitoring.

Once the model is fully trained and validated it is typically deployed to the network in the relevant entity (UE, gNB, or LMF). The main problem is how to monitor the fully trained model performance when it is deployed in the field. Typically, labelled data is used to validate the model inference.

In some cases, there may be no labeled data available to monitor the performance of the model and perform actions such as selection/deactivation/switching. For example, UE might encounter a new environment (e.g., RF conditions, availability of TRPs) that has significantly different characteristics from the environment where the AI/ML model is trained. In such situation network would like to occasionally monitor the model performance to maintain the trust of the positioning estimates.

Self-retuning of the model based on the performance output have limitations in the absence of relevant labelled data. Therefore, how to enhance the model monitoring in ML-based positioning without ground truth may need to be further discussed.

According to some example embodiments of the present disclosure, there is provided a solution for model monitoring for positioning. In this solution, the first apparatus 110 may determine at least one reference location associated with a positioning performance monitoring of a second apparatus 120, for example, based on three or more TRPs and generate assistance data for monitoring a positioning performance. For example, the assistance data may comprise positioning measurement data of at least one positioning measurement type in the at least one reference location, and monitoring metrics associated with the at least one positioning measurement type in the at least one reference location or the at least one reference location. The first apparatus 110 may transmit the assistance data to the second apparatus 120 for the second apparatus 120 to monitor the positioning performance. The solution of the present disclosure has the advantage of not relying exclusively on collected ground truth labels thanks to the generation and use of 'artificial' or synthetical data samples while considering the UE capability.

Example embodiments of the present disclosure will be described in detail below with reference to the accompanying drawings.

Figure 2:
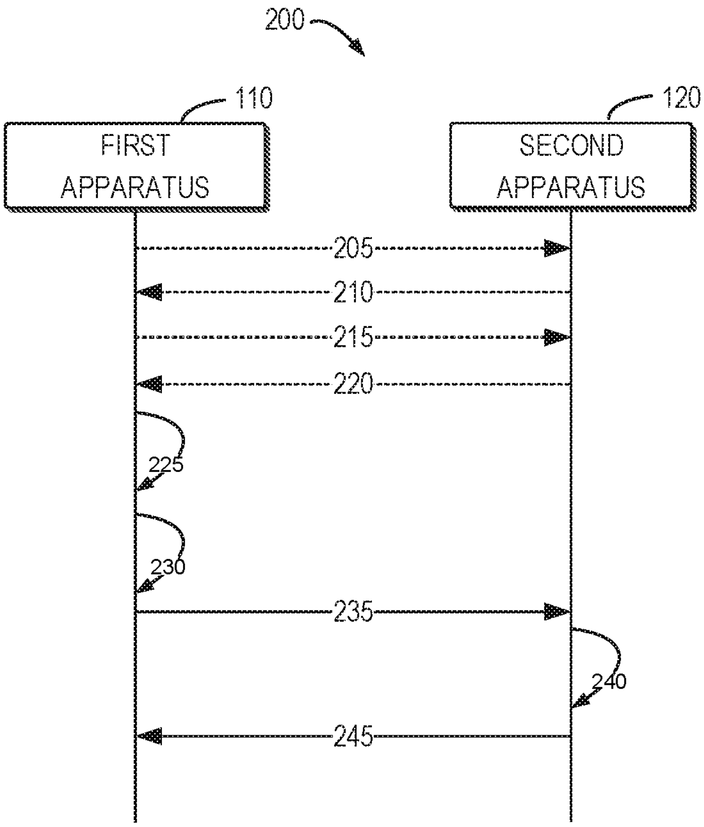
FIG. 2 illustrates a signaling chart for model monitoring according to some example embodiments of the present disclosure.

FIG. 2 illustrates a signaling chart 200 for performance monitoring according to some example embodiments of the present disclosure. For the purposes of discussion, the signaling chart 200 will be discussed with reference to FIG. 1, for example, by using the first apparatus 110 and the second apparatus 120.

In the example of FIG. 2, there is a ML model running at the second apparatus 120 for performing a positioning of the second apparatus 120. The monitoring of ML-based positioning may refer to a check on the performance of the ML model. Since the network may have little to no knowledge about characteristics of the ML model. For this reason, the monitoring is a mandatory operation to ensure that the ML model running at the second apparatus 120 matches the expectations of the networks mainly in terms of achievable accuracy and generalization.

A monitoring process may be performed based on known dataset, e.g., $S=(X_i, M_i)_{1 \le i \le K}$, where $X_i$ refers to the geographical position and $M_i$ to the positioning reference signal (PRS) measurements made at the considered positions. The ML Model running at the second apparatus 120 may be referred to as f (which is not known to the network). Thus, the monitoring may consist in comparing: $X_i$ to $\overline{X}_\iota$ such as $\overline{X}_\iota=f(M_i)$.

A null to small difference may indicate that the ML model is performing as expected but a gap will indicate an issue with the ML model and need to react accordingly (e.g., With a model retraining).

In the example of FIG. 2, the dataset S may be prepared with pre-selected geographical positions $X_i$. This selection can be realized by the first apparatus 110 and could be either random positions within the ML model validity region or also selected positions in sensitive areas. Thereafter, for these specific positions $X_i$, the corresponding radio measurements $M_i$ (such ToA) are estimated.

In order to monitor or to evaluate the performance, capability, and the efficacy of the trained AI/ML model deployed at the second apparatus 120 and/or other UEs, the first apparatus 110 may signal few test data points obtained from a trusted source to all the UEs for the model inference together with the associated input parameters.

The LCM procedures, e.g., model activation, deactivation, switching, etc., that result from the monitoring procedure may be UE-based or LMF-based. That is, either the second apparatus 120 decides the LCM procedure, or the first apparatus 110 decides the LCM procedure.

In the UE-based case, e.g., a UE-based model monitoring, as one option shown in FIG. 2, the first apparatus 110 may transmit (205), through broadcast information, an indication that the monitoring data for the positioning performance monitoring is available. Upon receiving the broadcasting information, the second apparatus 120 may transmit (210) a request for the labeled data required for computing the monitoring KPI. As another option, the second apparatus 120 may transmit (210) a request for the labeled data required for computing the monitoring without receiving the broadcasting information.

The LMF-based procedure has two sub-cases: UE-initiated and LMF-initiated. In the UE-initiated case, the second apparatus 120 may acquire the labeled data as in the UE-based case (i.e., two options as mentioned above), but the LCM procedure decision would be made by the first apparatus 110.

In the LMF-initiated case, the first apparatus 110 may transmit (215) a request for performing the model monitoring procedure to the second apparatus 120, and the second apparatus 120 may need to request (220) monitoring data from the first apparatus 110 if it was not acquired through broadcast information.

As shown in FIG. 2, the first apparatus 110 may determine (225) a set of reference locations associated with a monitoring of positioning performance at the second apparatus 120. The set of reference locations may be selected by the first apparatus 110 randomly. For example, the set of reference locations may represent as $X=\{x_1, x_2, \ldots x_n\}$.

As an example, the first apparatus 110 may be aware of a coarse location of the second apparatus 120. Then, the first apparatus 110 may select N>=1 reference location(s) on a map relevant to a sensitive area, e.g., the coarse location of the second apparatus 120. The selected N>=1 reference location(s) may refer to three or more TRPs or any other suitable reference points (such as gNBs). For example, the set of reference locations may be associated with $N_T$ TRPs as $\mathcal{T}=\{1, 2, \ldots, N_T\}$.

Based on the determined set of reference locations, the second apparatus 120 may generate (230) assistance data for monitoring a positioning performance at the second apparatus 120.

For example, a synthetic operation may be performed at the first apparatus 110 based on the determined set of reference locations. In the synthetic operation, corresponding monitoring measurement and monitoring data may be created.

Once the synthetic operation is performed with certain environmental conditions/scenarios, a stimulation object (e.g., the second apparatus 120) may be chosen at random by the first apparatus 110 for evaluation.

Specifically, for the stimulation object, the first apparatus 110 may extract the synthetic data of at least one positioning measurement type, e.g., channel impulse response (CIR), ToA, reference signal time difference (RSTD) from the PRS transmitted by all reference locations in the simulation setup.

In addition, the first apparatus 110 also estimates the other ground truth label data listed as mentioned above. Since an AL/ML model for performing the synthetic operation is running at the first apparatus 110, it is easier for the first apparatus 110 to obtain all the associated intermediate metrics used for assisted AI/ML positioning together with the respective CIRs.

Since the calibration is performed at each reference location, there is no need to model the impairments in the synthetic data. However, if the first apparatus 110 has the data of network timing alignment/synchronization error, then it may also include them in the simulation model setup to mimic the real environment.

For example, for a stimulation object (e.g., the second apparatus 120) $x_i=X$, a list of possible input, represented as $\mathcal{J}=\{CIR_{b,i}, \tau_{b,i}\}, \forall_i$, may be created based on the synthetic operation, which may be implemented by the synthetic model available at the first apparatus 110.

That is, the first apparatus 110 may determine positioning measurement data of at least one positioning measurement type (e.g., CIR) in the set of reference locations. It is to be understood that other positioning measurement type(s) may also be used for the synthetic operation, such as reference signal received power (RSRP), reference signal received path power (RSRPP), observed time difference of arrival (OTDOA), multi-round time trip (multi-RTT), ToA, angle of arrival (AoA), angle of departure (AoD), power delay profile (PDP) or RSTD.

In addition to the list of possible input, the first apparatus 110 may further determine, based on the synthetic operation, a list of monitoring metrics associated with the at least one positioning measurement type in the at least one reference location, which may be used for the model monitoring at the second apparatus 120 when using inputs of the list of possible input. The list of monitoring metrics may represent as $\mathcal{M}_i=\{\tau_{b,\bar{b},i}, RSRP_{b,i}, RSRPP_{b,i}, AOD_{b,i}, CIR_{b,i}, PDP_{b,i}, x_i\}, \forall_i$.

Although the assistance data (i.e., synthetic data) are generated at the first apparatus 110 after receiving the request from the second apparatus 120 as shown in FIG. 2, it is to be understood that the generation of the assistance data may also be performed before the request from the second apparatus 120.

The first apparatus 110 may transmit (235), to the second apparatus 120, the assistance data for monitoring a positioning performance at the second apparatus 120 including the created list of possible inputs and the list of monitoring metrics. The assistance data may represent as an established set $\mathcal{S}_i=\{\mathcal{J}_i, \mathcal{M}_i\}_{1\le i\le K}$.

The first apparatus 110 may share the assistance data to the second apparatus based on an explicit request from the second apparatus 120 or triggered by the first apparatus 110, which may depend on whether an LCM procedure is UE-based or LMF-based and/or whether the model monitoring is initiated by the first apparatus 110 or the second apparatus 120.

The first apparatus 110 may share the assistance data to the second apparatus based on an explicit request from the second apparatus 120 or triggered by the first apparatus 110, which may depend on whether an LCM procedure is UE-based or LMF-based and/or whether the model monitoring is initiated by the first apparatus 110 or the second apparatus 120.

As an option, the assistance data for monitoring a positioning performance (i.e., monitoring dataset $\mathcal{S}_i$) may be transmitted to the second apparatus 120 through broadcasting, e.g., via a Positioning system information block (POS SIB) message. For this case, it has the advantage that the broadcasted information may reach more than one UEs at the same time.

As another option, the assistance data may be transmitted to the second apparatus 120 through unicast, e.g., a dedicated LTE Positioning Protocol (LPP) message.

As described above, the monitoring dataset $\mathcal{S}_i$ may refer to several measurement types to handle multiple models with different input configurations.

Furthermore, along with the assistance data, associated configuration related to assistance data may be provided to the second apparatus 120 as well (e.g., at least one measurement type, the number of reference locations) and also an indication depicting the presence of the ground truth.

Once the monitoring dataset $\mathcal{S}_i$ is received, the second apparatus 120 may perform (240) a monitoring of positioning performance by using the monitoring dataset.

For example, the second apparatus 120 may extract the inputs $\mathcal{J}_i$ tailored to the model running at the second apparatus 120 and perform ML model inference with these inputs and get the monitoring metric estimate $\bar{m}_i=f(\mathcal{J}_i)$.

That is, the extracted inputs $\mathcal{J}_i$ may be fed to the ML-based positioning model at the second apparatus 120 and the corresponding monitoring metric estimate $\bar{m}_i=f(\mathcal{J}_i)$ may be obtained as the output of the ML-based positioning model.

For example, upon receiving the CIR and the associated configurations, the second apparatus 120 may use the CIR as the model input for the corresponding reference location and perform the model inference based on ML-based positioning model.

Then the estimated metric $\bar{m}_i$ (which may be referred to as intermediate key performance indicators (KPIs) of inference data) may be compared to the one indicated in the list of monitoring metrics $\mathcal{M}_i$ (which may also be referred to as the synthetical ground truth label). Finally, the second apparatus 120 may derive a monitoring metric, optionally aggregating the obtained results on all the positions within the monitoring dataset $\mathcal{S}_i$, e.g., average Minimum Mean Square Error (MMSE) or cumulative distribution function (CDF) value at 90%.

In some embodiments, if the model monitoring is triggered by the second apparatus 120, the second apparatus 120 may either use the monitoring metric internally to, e.g., switch the model for a better one, or report (245) the monitoring metric to the first apparatus 110 so that the first apparatus 110 may take the appropriate action.

In some other embodiments, if the first apparatus 110 triggered the model monitoring, the second apparatus 120 may report (245) the monitoring metric to the first apparatus 110 subject to the notification requirement configured by the first apparatus 110.

For example, after verifying the model accuracy with monitoring metrics $\mathcal{M}_i$ (i.e., the synthetical ground truth label), if the model accuracy is not up to the expectation set by the first apparatus 110 for certain accuracy requirements, the second apparatus 120 may report the same to the first apparatus 110 or may be used to switch the model.

As mentioned above, the monitoring data including the corresponding the synthetical ground truth label may be created at the first apparatus 110. As another example, the second apparatus 120 may request the monitoring data (e.g., a set of reference locations) and perform the synthetic operation at the second apparatus 120 and compute the monitoring metric by itself.

Figure 3:
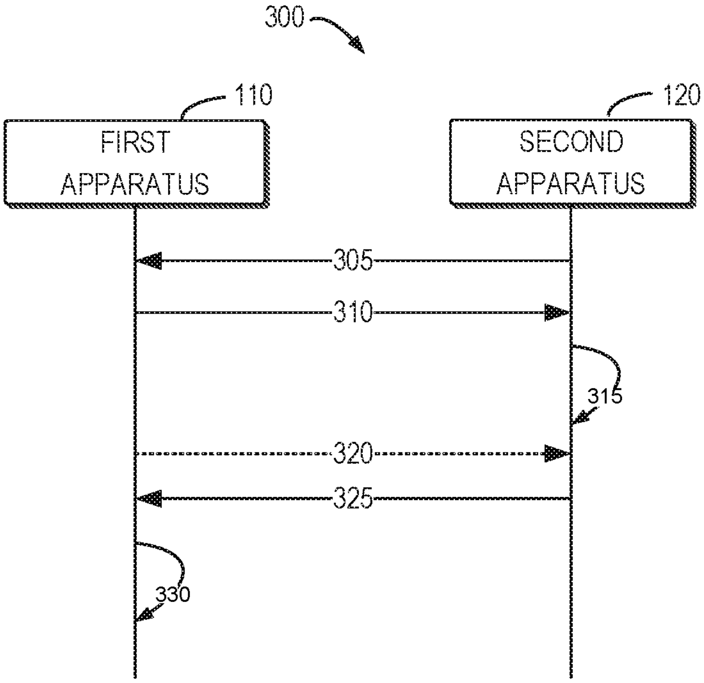
FIG. 3 illustrates a further signaling chart for model monitoring according to some example embodiments of the present disclosure.

FIG. 3 illustrates a signaling chart 300 for performance monitoring according to some example embodiments of the present disclosure. For the purposes of discussion, the signaling chart 300 will be discussed with reference to FIG. 1, for example, by using the first apparatus 110 and the second apparatus 120.

Now the reference is made to FIG. 3, the second apparatus 120 may transmit (305) a request of assistance data (e.g., one or more reference locations) to the first apparatus 110. The first apparatus 110 may provide (310) the information of one or more reference locations as the assistance data to the second apparatus 120. For example, the set of reference locations may be associated with $N_{\mathcal{T}}$ TRPs as $\mathcal{T}=\{1, 2, \ldots, N_{\mathcal{T}}\}$, which are related to a coarse location of the second apparatus 120.

Based on the one or more reference locations, the second apparatus 120 may compute (315) the synthetic input such as (CIR) or any other intermediate feature(s) and the relevant ground truth for the purpose of model monitoring.

In some embodiments, the first apparatus 110 may transmit (320) to the second apparatus a requirement to report monitoring output generated at the second apparatus 120 and associated configuration related to synthetic data. Then the second apparatus 120 may report (325) the required monitoring output and associated configuration related to synthetic data to the first apparatus 110.

In some embodiments, the second apparatus 120 may periodically report (325) monitoring output and associated configuration related to synthetic data.

Then the first apparatus 110 may configure (330) the periodicity of the reporting, e.g., based on the observed radio frequency conditions by the second apparatus 120.

In still some other embodiments, the second apparatus 120 may share the synthetic inputs (either generated at the second apparatus 120 or received from the first apparatus 110) with neighboring UEs (not shown) through Sidelink. In this case, the second apparatus 120 may share additional indication when sending these data to inform neighboring UEs that these data are generated synthetically.

Additionally, or optionally, the first apparatus 110 provides the monitoring data to the UEs through a broadcast signalling, e.g., SIB with the support of their serving gNB (s). This new signalling may indicate to the UEs the monitoring data and corresponding configuration. In this way, the UEs may extract the relevant data related to their own model. Optionally, the signalling can include an explicit indication that the data is generated synthetically.

Furthermore, UEs with similar conditions and running the same model ID/functionality ID may be grouped together. Thus, only a subset UEs from each group (or at least one) could be chosen to receive the monitoring data and assess the performance of the model. This has the advantage of avoiding performing the monitoring on all UEs.

In this way, model monitoring can be performed in absence of ground truth. The solution of the present disclosure allows allows the provision of 'synthetic' data to evaluate and monitor the performance of the model without knowledge of ground truth.

Furthermore, the solution of the present disclosure allows to enable and differentiate the monitoring realized on real data and synthetic data (1) through the trigger of synthetic data generation, (2) the use of a new flag/indication to send a specific type of data and (3) the estimation of a dedicated monitoring KPI per type of data. This hybrid monitoring allows the LMF to continually check the performance of the model and perform the necessary updates with minimum delay (not waiting until getting the real ground truth data available). Furthermore, the hybrid monitoring may also mean monitoring performed between two entities, e.g., the UE performs an inference on an input provided for monitoring, and the LMF evaluates the output of the model to calculate the KPI.

By using the assistance data (either real or synthetic) described above, the model update e.g., including the model refinement based on KPI associated with synthetic data and model re-training based on KPI associated with real data can be achieved.

Figure 4:
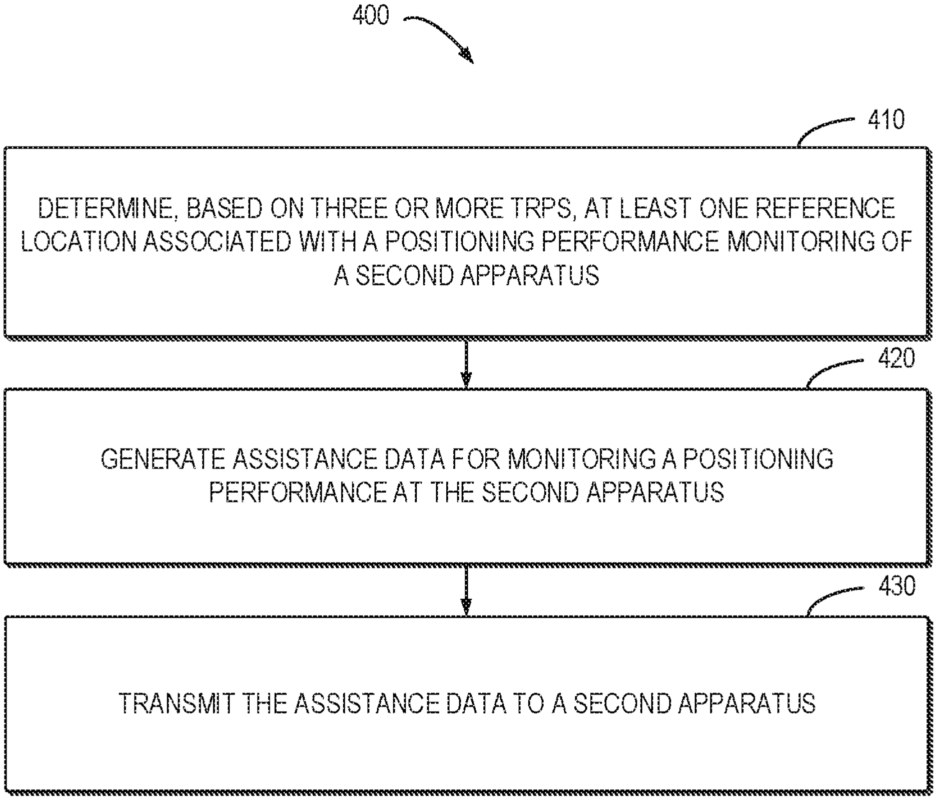
FIG. 4 illustrates a flowchart of a method implemented at a first apparatus according to some example embodiments of the present disclosure.

FIG. 4 shows a flowchart of an example method 400 implemented at a first device in accordance with some example embodiments of the present disclosure. For the purpose of discussion, the method 400 will be described from the perspective of the first apparatus 110 in FIG. 1.

At block 410, the first apparatus 110 determines, based on three or more transmission reception points, TRPs, at least one reference location associated with a positioning performance monitoring of a second apparatus.

At block 420, the first apparatus 110 generates assistance data for monitoring a positioning performance at the second apparatus at least comprising at least one of: respective positioning measurement data of at least one positioning measurement type in the at least one reference location; respective monitoring metric associated with the at least one positioning measurement type in the at least one reference location; or the at least one reference location.

At block 430, the first apparatus 110 transmits the assistance data to a second apparatus.

In some example embodiments, the method 400 further comprises: transmitting, to the second apparatus and via a broadcast signaling, an indication that the assistance data for monitoring the positioning performance is available.

In some example embodiments, the method 400 further comprises: receiving, from the second apparatus, a request of the assistance data monitoring the positioning performance at the second apparatus.

In some example embodiments, the method 400 further comprises: transmitting, to the second apparatus, a request of monitoring the positioning performance.

In some example embodiments, the method 400 further comprises: transmitting the assistance data to the second apparatus via at least one of the following: a broadcast signaling, or a unicast signaling, or through a serving cell of the second apparatus by a broadcast signaling.

In some example embodiments, the assistance data further comprises the number of the three or more TRPs.

In some example embodiments, the at least one positioning measurement type comprises at least one of: reference signal received power, reference signal received path power, observed time difference of arrival, multi-round time trip, time of arrival, angle of arrival, angle of departure, channel impulse response, power delay profile or reference signal time difference.

In some example embodiments, the method 400 further comprises: determining the respective positioning measurement data at each of the at least one reference location; and determining the assistance data by performing a synthetic procedure based on the respective positioning measurement data and the at least one reference location.

In some example embodiments, the positioning at the second apparatus is performed based on a machine learning positioning model, wherein an input of the machine learning positioning model comprises one or more positioning measurement data of at least one positioning measurement type, and an output comprises information associated with the position of the second apparatus.

In some example embodiments, the first apparatus comprises a location management function and the second apparatus comprises a terminal device.

Figure 5:
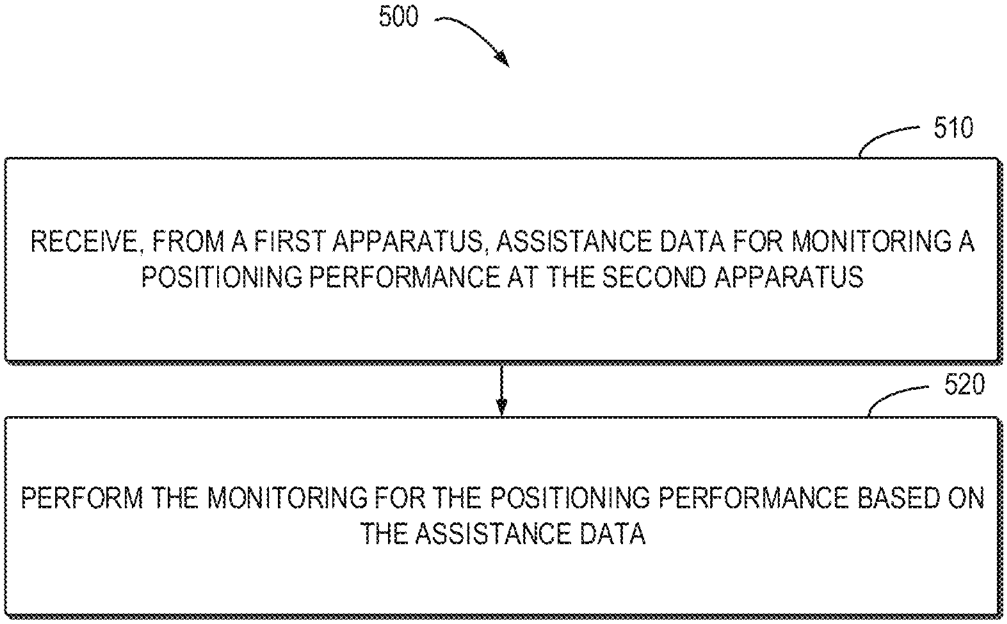
FIG. 5 illustrates a flowchart of a method implemented at a second apparatus according to some example embodiments of the present disclosure.

FIG. 5 shows a flowchart of an example method 500 implemented at a second device in accordance with some example embodiments of the present disclosure. For the purpose of discussion, the method 500 will be described from the perspective of the second apparatus 120 in FIG. 1.

At block 510, the second apparatus 120 receives, from a first apparatus, assistance data for monitoring a positioning performance at the second apparatus comprising at least one of: respective positioning measurement data of at least one positioning measurement type in at least one reference location associated with a positioning performance monitoring of the second apparatus; respective monitoring metric associated with the at least one positioning measurement type in the at least one reference location; or the at least one reference location.

At block 520, the second apparatus 120 performs the monitoring for the positioning performance based on the assistance data.

In some example embodiments, the method 500 further comprises: receiving, from the first apparatus via a broadcast signaling, an indication that the assistance data for monitoring the positioning performance is available.

In some example embodiments, the method 500 further comprises: transmitting, to the first apparatus, a request of the assistance data monitoring the positioning performance at the second apparatus.

In some example embodiments, the method 500 further comprises: receiving, from the first apparatus, a request of monitoring the positioning performance.

In some example embodiments, the method 500 further comprises: receiving the assistance data to from the first apparatus via at least one of the following: a broadcast signaling, or a unicast signaling, or through a serving cell of the second apparatus by a broadcast signaling.

In some example embodiments, the assistance data further comprises the number of three or more TRPs for determining the at least one reference location.

In some example embodiments, the at least one positioning measurement type comprises at least one of: reference signal received power, reference signal received path power, observed time difference of arrival, multi-round time trip, time of arrival, angle of arrival, angle of departure, channel impulse response, power delay profile or reference signal time difference.

In some example embodiments, the method 500 further comprises: determining, based on the at least one reference location, respective monitoring metric associated with the at least one positioning measurement type at the at least one reference location.

In some example embodiments, the method 500 further comprises: reporting, to the first apparatus, a result of the monitoring based on a request from the first apparatus or periodically.

In some example embodiments, the method 500 further comprises: transmitting the assistance date to a third apparatus via Sidelink.

In some example embodiments, the positioning at the second apparatus is performed based on a machine learning positioning model, wherein an input of the machine learning positioning model comprises one or more positioning measurement data of at least one positioning measurement type, and an output comprises information associated with the position of the second apparatus.

In some example embodiments, the first apparatus comprises a location management function and the second apparatus comprises a terminal device.

In some example embodiments, a first apparatus capable of performing any of the method 400 (for example, the first apparatus 110 in FIG. 1) may comprise means for performing the respective operations of the method 400. The means may be implemented in any suitable form. For example, the means may be implemented in a circuitry or software module. The first apparatus may be implemented as or included in the first apparatus 110 in FIG. 1.

In some example embodiments, the first apparatus comprises means for determining, based on three or more transmission reception points, TRPs, at least one reference location associated with a positioning performance monitoring of a second apparatus; means for generating assistance data for monitoring a positioning performance at the second apparatus at least comprising at least one of: respective positioning measurement data of at least one positioning measurement type in the at least one reference location; respective monitoring metric associated with the at least one positioning measurement type in the at least one reference location; or the at least one reference location; and means for transmitting the assistance data to a second apparatus.

In some example embodiments, the first apparatus further comprises: means for transmitting, to the second apparatus and via a broadcast signaling, an indication that the assistance data for monitoring the positioning performance is available.

In some example embodiments, the first apparatus further comprises: means for receiving, from the second apparatus, a request of the assistance data monitoring the positioning performance at the second apparatus.

In some example embodiments, the first apparatus further comprises: means for transmitting, to the second apparatus, a request of monitoring the positioning performance.

In some example embodiments, the first apparatus further comprises: means for transmitting the assistance data to the second apparatus via at least one of the following: a broadcast signaling, or a unicast signaling, or through a serving cell of the second apparatus by a broadcast signaling.

In some example embodiments, the assistance data further comprises the number of the three or more TRPs.

In some example embodiments, the at least one positioning measurement type comprises at least one of: reference signal received power, reference signal received path power, observed time difference of arrival, multi-round time trip, time of arrival, angle of arrival, angle of departure, channel impulse response, power delay profile or reference signal time difference.

In some example embodiments, the first apparatus further comprises: means for determining the respective positioning measurement data at each of the at least one reference location; and means for determining the assistance data by performing a synthetic procedure based on the respective positioning measurement data and the at least one reference location.

In some example embodiments, the positioning at the second apparatus is performed based on a machine learning positioning model, wherein an input of the machine learning positioning model comprises one or more positioning measurement data of at least one positioning measurement type, and an output comprises information associated with the position of the second apparatus.

In some example embodiments, the first apparatus comprises a location management function and the second apparatus comprises a terminal device.

In some example embodiments, the first apparatus further comprises means for performing other operations in some example embodiments of the method 400 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 500 (for example, the second apparatus 120 in FIG. 1) may comprise means for performing the respective operations of the method 500. The means may be implemented in any suitable form. For example, the means may be implemented in a circuitry or software module. The second apparatus may be implemented as or included in the second apparatus 120 in FIG. 1.

In some example embodiments, the second apparatus comprises means for receiving, from a first apparatus, assistance data for monitoring a positioning performance at the second apparatus comprising at least one of: respective positioning measurement data of at least one positioning measurement type in at least one reference location associated with a positioning performance monitoring of the second apparatus; respective monitoring metric associated with the at least one positioning measurement type in the at least one reference location; or the at least one reference location; and means for performing the monitoring for the positioning performance based on the assistance data.

In some example embodiments, the second apparatus further comprises: means for receiving, from the first apparatus and via a broadcast signaling, an indication that the assistance data for monitoring the positioning performance is available.

In some example embodiments, the second apparatus further comprises: means for transmitting, to the first apparatus, a request of the assistance data monitoring the positioning performance at the second apparatus.

In some example embodiments, the second apparatus further comprises: means for receiving, from the first apparatus, a request of monitoring the positioning performance.

In some example embodiments, the second apparatus further comprises: means for receiving the assistance data to from the first apparatus via at least one of the following: a broadcast signaling, or a unicast signaling, or through a serving cell of the second apparatus by a broadcast signaling.

In some example embodiments, the assistance data further comprises the number of three or more TRPs for determining the at least one reference location.

In some example embodiments, the at least one positioning measurement type comprises at least one of: reference signal received power, reference signal received path power, observed time difference of arrival, multi-round time trip, time of arrival, angle of arrival, angle of departure, channel impulse response, power delay profile or reference signal time difference.

In some example embodiments, the second apparatus further comprises: means for determining, based on the at least one reference location, respective monitoring metric associated with the at least one positioning measurement type at the at least one reference location.

In some example embodiments, the second apparatus further comprises: means for reporting, to the first apparatus, a result of the monitoring based on a request from the first apparatus or periodically.

In some example embodiments, the second apparatus further comprises: means for transmitting the assistance date to a third apparatus via Sidelink.

In some example embodiments, the positioning at the second apparatus is performed based on a machine learning positioning model, wherein an input of the machine learning positioning model comprises one or more positioning measurement data of at least one positioning measurement type, and an output comprises information associated with the position of the second apparatus.

In some example embodiments, the first apparatus comprises a location management function and the second apparatus comprises a terminal device.

In some example embodiments, the second apparatus further comprises means for performing other operations in some example embodiments of the method 500 or the second apparatus 120. In some example embodiments, the means comprises at least one processor; and at least one memory storing instructions that, when executed by the at least one processor, cause the performance of the second apparatus.

Figure 6:
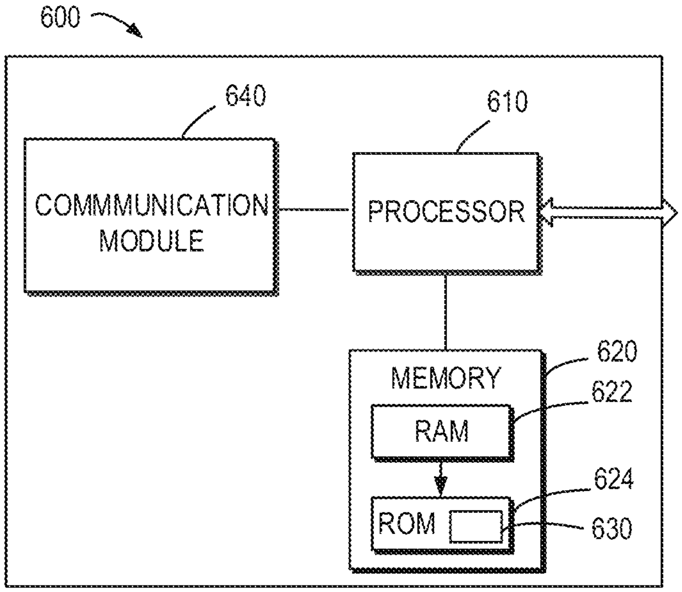
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement a communication device, for example, the first apparatus 110 or the second apparatus 120 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
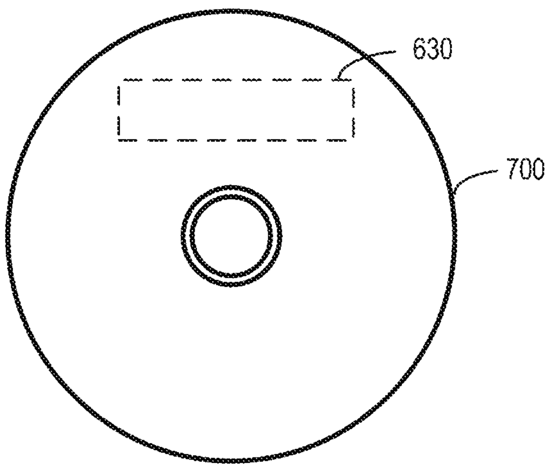
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus comprising:
a processor; and
a memory storing computer-executable instructions that, when executed by the processor, cause the first apparatus to operate as a Location Management Function (LMF) in a cellular communication network, and further cause the first apparatus to perform the following operations:
determining, based on at least three transmission reception points (TRPs), at least one reference location associated with positioning performance monitoring of a second apparatus that is a user equipment (UE);
generating, at the LMF, synthetic assistance data for monitoring a positioning performance of a machine-learning (ML) positioning model executing at the UE, the synthetic assistance data comprising, for the at least one reference location: (a) synthetic positioning measurement data of a positioning measurement type comprising synthetic channel impulse response (CIR) data derived from positioning reference signals (PRS) associated with the at least three TRPs; and (b) a corresponding synthetic monitoring metric comprising a synthetic time-of-arrival (ToA) value associated with the at least one reference location;
transmitting, via broadcast signaling, an indication that the synthetic assistance data for positioning performance monitoring is available, without transmitting the synthetic assistance data in the broadcast signaling;
receiving, from the UE and in response to the broadcast signaling, an explicit request for the synthetic assistance data; and
only after receiving the explicit request from the UE, transmitting the synthetic assistance data to the UE via a dedicated unicast long term evolution (LTE) Positioning Protocol (LPP) message, wherein the synthetic assistance data further comprises:
(i) an indication that the synthetic assistance data is synthetically generated for model monitoring; and
(ii) configuration information identifying the positioning measurement type as CIR and the monitoring metric as ToA, and wherein the synthetic assistance data is configured to enable the UE to input the synthetic CIR data into the ML positioning model and compare a ToA output of the ML positioning model to the synthetic ToA value monitoring metric to derive a monitoring key performance indicator.

2. The first apparatus of claim 1, wherein determining the at least one reference location comprises selecting exactly one reference location, and wherein the at least three TRPs consist of exactly three TRPs.

3. The first apparatus of claim 2, wherein the at least one reference location is selected based on a coarse location estimate of the UE stored at the LMF, and wherein the at least one reference location lies within a predefined distance threshold from the coarse location estimate.

4. The first apparatus of claim 3, wherein generating the synthetic assistance data comprises performing a synthetic radio environment simulation at the LMF that models PRS propagation from the at least three TRPs to the at least one reference location.

5. The first apparatus of claim 4, wherein the synthetic radio environment simulation further incorporates network timing alignment error parameters associated with the at least three TRPs.

6. The first apparatus of claim 5, wherein the synthetic CIR data comprises a power delay profile (PDP) derived from the synthetic CIR data, and the synthetic assistance data further includes the power delay profile.

7. The first apparatus of claim 6, wherein the broadcast signaling comprises a Positioning System Information Block (POS SIB) transmitted via a serving gNB of the UE.

8. The first apparatus of claim 7, wherein the dedicated unicast LTE LPP message further includes an identifier of the ML positioning model executing at the UE.

9. The first apparatus of claim 8, wherein the monitoring key performance indicator comprises an average minimum mean square error (MMSE) calculated over a plurality of reference locations included in the synthetic assistance data.

10. The first apparatus of claim 9, wherein the computer-executable instructions further cause the first apparatus to configure a periodicity for the UE to report the monitoring key performance indicator following transmission of the synthetic assistance data.

11. A method performed by a first apparatus operating as a Location Management Function (LMF) in a cellular communication network, the method comprising:
determining, based on at least three transmission reception points (TRPs), at least one reference location associated with positioning performance monitoring of a second apparatus that is a user equipment (UE);
generating, at the LMF, synthetic assistance data for monitoring a positioning performance of a machine-learning (ML) positioning model executing at the UE, the synthetic assistance data comprising, for the at least one reference location: (a) synthetic positioning measurement data of a positioning measurement type comprising synthetic channel impulse response (CIR) data derived from positioning reference signals (PRS) associated with the at least three TRPs; and (b) a corresponding synthetic monitoring metric comprising a synthetic time-of-arrival (ToA) value associated with the at least one reference location;
transmitting, via broadcast signaling, an indication that the synthetic assistance data for positioning performance monitoring is available, without transmitting the synthetic assistance data in the broadcast signaling;
receiving, from the UE and in response to the broadcast signaling, an explicit request for the synthetic assistance data; and
only after receiving the explicit request from the UE, transmitting the synthetic assistance data to the UE via a dedicated unicast long term evolution (LTE) Positioning Protocol (LPP) message, wherein the synthetic assistance data further comprises:
(i) an indication that the synthetic assistance data is synthetically generated for model monitoring; and
(ii) configuration information identifying the positioning measurement type as CIR and the monitoring metric as ToA, and wherein the synthetic assistance data is configured to enable the UE to input the synthetic CIR data into the ML positioning model and compare a ToA output of the ML positioning model to the synthetic ToA value monitoring metric to derive a monitoring key performance indicator.

12. The method of claim 11, wherein determining the at least one reference location comprises selecting exactly one reference location, and wherein the at least three TRPs consist of exactly three TRPs.

13. The method of claim 12, wherein the at least one reference location is selected based on a coarse location estimate of the UE stored at the LMF, and wherein the at least one reference location lies within a predefined distance threshold from the coarse location estimate.

14. The method of claim 13, wherein generating the synthetic assistance data comprises performing a synthetic radio environment simulation at the LMF that models PRS propagation from the at least three TRPs to the at least one reference location.

15. The method of claim 14, wherein the synthetic radio environment simulation further incorporates network timing alignment error parameters associated with the at least three TRPs.

16. The method of claim 15, wherein the synthetic CIR data comprises a power delay profile (PDP) derived from the synthetic CIR data, and the synthetic assistance data further includes the power delay profile.

17. The method of claim 16, wherein the broadcast signaling comprises a Positioning System Information Block (POS SIB) transmitted via a serving gNB of the UE.

18. The method of claim 17, wherein the dedicated unicast LTE LPP message further includes an identifier of the ML positioning model executing at the UE.

19. The method of claim 18, wherein the monitoring key performance indicator comprises an average minimum mean square error (MMSE) calculated over a plurality of reference locations included in the synthetic assistance data.

20. The method of claim 19, further comprising: configuring a periodicity for the UE to report the monitoring key performance indicator following transmission of the synthetic assistance data.

* * * * *